United States Patent [19]
Terhune

[11] Patent Number: 5,672,928
[45] Date of Patent: Sep. 30, 1997

[54] STABILIZED IN-VESSEL DIRECT CURRENT SOURCE

[75] Inventor: James Howard Terhune, San Jose, Calif.

[73] Assignee: General Electric Company, San Jose, Calif.

[21] Appl. No.: 505,411

[22] Filed: Jul. 21, 1995

Related U.S. Application Data

[63] Continuation-in-part of Ser. No. 384,997, Feb. 7, 1995, Pat. No. 5,577,083, which is a continuation-in-part of Ser. No. 239,773, May 9, 1994, Pat. No. 5,444,747.

[51] Int. Cl.⁶ .................................................. G21H 1/00
[52] U.S. Cl. ........................ 310/305; 310/302; 310/301
[58] Field of Search ............................... 310/305, 302, 310/301; 136/202, 253

[56] References Cited

U.S. PATENT DOCUMENTS

| | | | |
|---|---|---|---|
| 2,847,585 | 8/1958 | Christian | 310/3 |
| 2,859,361 | 11/1958 | Coleman | 310/3 |
| 3,678,303 | 7/1972 | Round | 310/3 R |
| 3,697,329 | 10/1972 | Bunker et al. | 136/202 |
| 3,706,893 | 12/1972 | Olsen et al. | 310/3 B |
| 3,767,930 | 10/1973 | Sayell | 250/493 |
| 3,767,947 | 10/1973 | Adler et al. | 310/30 |
| 3,934,162 | 1/1976 | Adler et al. | 310/3 A |
| 4,010,534 | 3/1977 | Anthony et al. | 29/572 |
| 4,024,420 | 5/1977 | Anthony et al. | 310/3 B |
| 4,215,189 | 7/1980 | Bergum et al. | 429/217 |
| 4,373,375 | 2/1983 | Terhune et al. | 73/19 |
| 4,489,269 | 12/1984 | Edling et al. | 322/2 R |
| 5,008,579 | 4/1991 | Conley et al. | 310/303 |
| 5,060,805 | 10/1991 | Fujii et al. | 209/3 |
| 5,108,696 | 4/1992 | Heck | 376/300 |
| 5,111,099 | 5/1992 | Smith | 310/305 |
| 5,235,232 | 8/1993 | Conley et al. | 310/303 |
| 5,396,141 | 3/1995 | Jantz et al. | 310/303 |
| 5,464,706 | 11/1995 | Dasgupta et al. | 429/194 |

Primary Examiner—Charles T. Jordan
Assistant Examiner—Meena Chelliah
Attorney, Agent, or Firm—James E. McGinness; Dennis M. Flaherty

[57] ABSTRACT

A method for stabilizing direct current generated by neutron activation of a plurality of interconnected β-emitter (nuclear decay electron) cells, which are placed in a specific position in the out-of-core region of a light water nuclear reactor. The method entails a synergistic combination of neutron-absorbing isotopes, in specific relationship to each other, the amount of each absorber and their respective locations in the neutron flux field being chosen to render the total current-time characteristic substantially constant over a significant number of reactor full-power-years. The method enhances the current output and lifetime of the current generator by greatly deferring burn-up of the neutron absorbers. If configured as a DC voltage source for powering radiation-hardened, high-temperature integrated circuitry contained in the reactor pressure vessel, voltage regulation circuitry is not necessary. Typically, the useful lifetime is rendered independent of output current and can be extended indefinitely, thereby greatly reducing replacement costs.

14 Claims, 3 Drawing Sheets

STABILIZED IN-VESSEL DIRECT CURRENT SOURCE

RELATED PATENT APPLICATIONS

This is a continuation-in-part application of U.S. patent application Ser. No. 08/384,997 filed on Feb. 7, 1995, U.S. Pat. No. 5,577,083, issued on Feb. 7, 1995 which in turn is a continuation-in-part application of U.S. patent application Ser. No. 08/239,773 filed on May 9, 1994, U.S. Pat. No. 5,444,747.

FIELD OF THE INVENTION

This invention generally relates to stand-alone means for generating low-power direct current or DC voltage.

BACKGROUND OF THE INVENTION

Beta-decay is a common decay mode of many nuclear isotopes whereby the nucleus spontaneously converts a neutron to an energetic electron (β-particle) ejected from the nucleus, a proton retained in the nucleus and an antineutrino. Beta-decay is a manifestation of the so-called weak force in the nucleus, which obeys all the classical conservation laws, except parity in a small percentage of decay events. It is known, both theoretically and experimentally, that the emitted electron cannot exist in the nucleus prior to emission. It is created, in every respect exactly like any electron, during the decay process, in which the original nucleus is converted to a new element with the same mass number (A), but with one additional proton (Z→Z+1).

Beta-particles (or rays) can carry substantial kinetic energy when emitted. The energy distribution (spectrum) of these particles is continuous and displays a maximum energy, above which no particles exist. Their absorption in materials is known to vary inversely as a power law in the maximum energy ($E_{max}$) and the spectrum is unchanged by absorption. In particular, the measurable activity of a β-emitter is limited by self-absorption in the source itself, a factor that must be considered when designing devices employing β-radiation. Typically, β-particles can be stopped by a millimeter thickness of most materials. Therefore, β-sources are inherently weak sources of radiation dosage.

Competing modes of decay usually exist for many β-emitters, such as electron capture, internal conversion, isomeric transition (γ-emission), positron emission and neutron capture. These competing modes do not produce useful electrons, so only the fraction of decay events that produce β-rays are of interest in the current context. Self-absorption also limits useful decay events to those that have a substantial maximum β-decay energy $E_{max}$ of the order of 1 MeV or greater. The neutron activation cross sections must be sufficiently large to produce appreciable currents by decay of daughter and granddaughter nuclides. Therefore, only a limited number of β-emitters are candidates for use in a β-battery.

A related patent application discloses a battery cell assembly which incorporates a mass of radioactive isotope material and a metallic collector electrically insulated from said radioactive isotope material by electrically insulating material. Referring to FIGS. 1A and 1B, the source assembly comprises a metallic collector 2 in the form of a hollow flat disk of metal containing the γ-emitting isotope material 4, which is electrically isolated from the metallic collector 2 by ceramic stand-off 6. Although not shown in FIGS. 1A and 1B, the current flows out of the current source assembly via an electrical lead connected to the metallic collector 2. Optionally, another electrical lead (not shown), which penetrates the metallic collector via a ceramic feed-through (not shown), has an end electrically connected to the β-emitting isotope material 4 for mitigating space charge build-up.

In accordance with one preferred embodiment, the β-emitting isotope material 4 is formed as a solid thin disk. Alternatively, the β-emitting isotope material is deposited on a substrate formed as a solid thin disk, which substrate may be made of material which is not a β-emitter. Also, the ceramic material may be replaced by any other suitable electrically insulating material able to withstand the thermal and radiological conditions of the reactor environment.

The above-described β-emitter can be used as either a current source, or preferably configured as a DC voltage source, capable of powering low-power, radiation-hardened, high-temperature integrated circuitry contained in the reactor vessel. As such, the device acts like a DC battery that is activated by (n, γ) reactions, both thermal and epithermal (by resonance capture). The device is not operable until exposed to a substantial neutron flux, so it has unlimited shelf-life and is not radioactive during manufacture.

A suitable isotope for use in a γ-battery cell is the metallic rare-earth element dysprosium, which can be configured in a "sandwich" geometry to generate sufficient current that a useful steady voltage can be generated by means of a simple voltage regulation circuit. This nuclear battery has a finite life, which depends on the flux levels it resides in and the current it is required to provide. Typically, the useful lifetime is several years for current output greater than a milliamp. Other potential candidates for use in a β-battery activated by neutron absorption are $Sn^{122}$, $Cs^{133}$, $Tm^{169}$, $Lu^{176}$, $Ir^{191}$, $Ir^{193}$ and $In^{113}$.

Battery life is a variable subject to design, within broad limits. The limiting factor in life of this source is the current demand. Effective lifetime and/or peak current capability can be addressed in the emitter design by combining more than one isotope in the proper proportions to give the desired current-time characteristic. For example, β-emitting isotopes which are suitable for combination in a β-battery activated by neutron absorption are $Dy^{164}$, $Tm^{169}$ and $Ir^{193}$. These nuclides are stable metals with high melting points and are suitable for use in nuclear reactors. The decay reactions for each of these nuclides are describable by a set of coupled, first-order differential equations for the isotopic density as a function of time. When combined in a heterogeneous "sandwich" geometry, each reaction chain is coupled with those lying upstream of it in the neutron flux, because of thermal neutron ($n_{th}$) absorption. Resonance absorption takes place in isolated (non-overlapping) resonances, so self-shielding of epithermal neutrons ($n_e$) occurs only in like nuclei of high concentration. The mathematical description of current versus time is, therefore, a complicated function of many variables and the particular geometry. There is a need to identify a specific combination of variables which renders the total output current essentially independent of time for a significant period of operation. Such a stabilized mode of operation would provide a desirable life extension.

SUMMARY OF THE INVENTION

The present invention is a method for stabilizing direct current generated by neutron activation of a plurality of interconnected β-emitter (nuclear decay electron) cells, which are placed in a specific position in the out-of-core region of a light water nuclear reactor. The method entails a synergistic combination of neutron-absorbing isotopes, in specific relationship to each other, the amount of each neutron-absorbing isotope and their respective locations in the neutron flux field being chosen to render the total current-time characteristic substantially constant over a significant number of reactor full-power-years. In accordance with a preferred embodiment of the invention, the currents generated by the decay of radioactive isotopes having different current-time characteristics and produced by neutron activation of three stable parent isotopes, e.g., $Tm^{169}$, $Dy^{164}$ and $Ir^{193}$, are combined at the battery output. This combination enhances the current output and lifetime of the neutron-activated current generator by greatly deferring burn-up of the neutron absorbers. If configured as a DC voltage source for powering radiation-hardened, high-temperature integrated circuitry contained within the reactor pressure vessel but outside of the core, voltage regulation circuitry is not necessary. Typically, the useful lifetime is rendered independent of output current and can be extended indefinitely, thereby greatly reducing replacement costs.

The stabilized direct current source of the invention provides means for generating essentially constant electrical current directly from a neutron-activated isomeric decay chain, without intervening conversion equipment. It utilizes a synergistic combination of nuclear isotopes, not commonly applied in the generation of nuclear power and chosen for their nuclear and physical properties, to generate electrical current from the $\beta$-decay of neutron-activated reaction products. The choice of $Tm^{169}$, $Dy^{164}$ and $Ir^{193}$ isotopes, in a unique arrangement and with specific $\beta$-emitter thicknesses, allows for stable, extended operating life in the reactor. Source life is extended when reactor shutdowns or power reductions occur, and ultimate end-of-life can be determined by design to be several reactor full-power-years.

DETAILED DESCRIPTION OF THE PREFERRED EMBODIMENTS

In accordance with the preferred embodiment of the invention, the currents generated by the decay of radioactive isotopes having different current-time characteristics and produced by neutron activation of three stable parent isotopes e.g., $Tm^{169}$, $Dy^{164}$ and $Ir^{193}$, are combined at the battery output. The neutron-activated partial decay schemes of pure $Tm^{169}$, $Dy^{164}$ and $Ir^{193}$ are as follows:

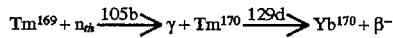

(0.95 MeV, 100%)

-continued

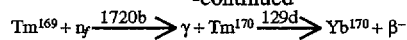

(0.95 MeV, 100%)

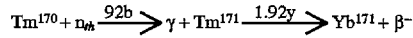

(0.097 MeV, 100%)

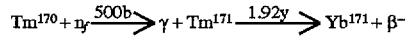

(0.097 MeV, 100%)

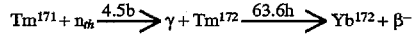

(1.28 MeV, 100%)

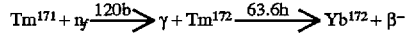

(1.28 MeV, 100%)

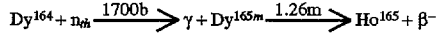

(0.79 MeV, 1.9%)

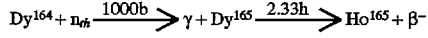

(1.27 MeV, 98%)

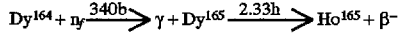

(1.27 MeV, 98%)

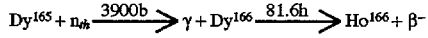

(0.404 MeV, 99%)

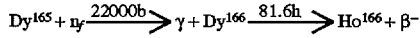

(0.404 MeV, 99%)

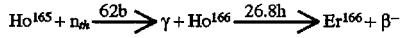

(1.79 MeV, 99.3%)

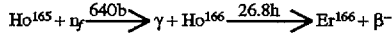

(1.79 MeV, 99.3%)

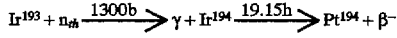

(2.24 MeV, 100%)

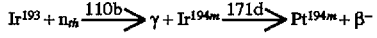

(0.24 MeV, 100%)

The notation used above is as follows: $n_{th}$, thermal neutron; $\hat{n}_r$ epithermal neutron at the central energy of an absorption resonance; b, barns; h, hours; d, days; m, months; and y, years.

Figure 1A:
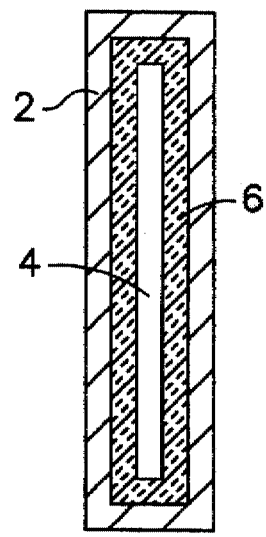
FIG. 1A and 1B are elevation and plan sectional views respectively of a $\beta$-battery cell construction suitable for use in the current generating assembly of the present invention.
Figure 1B:
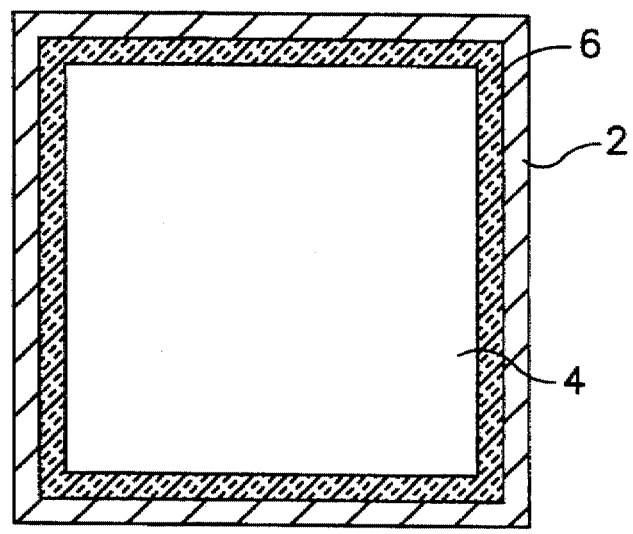
Figure 2:
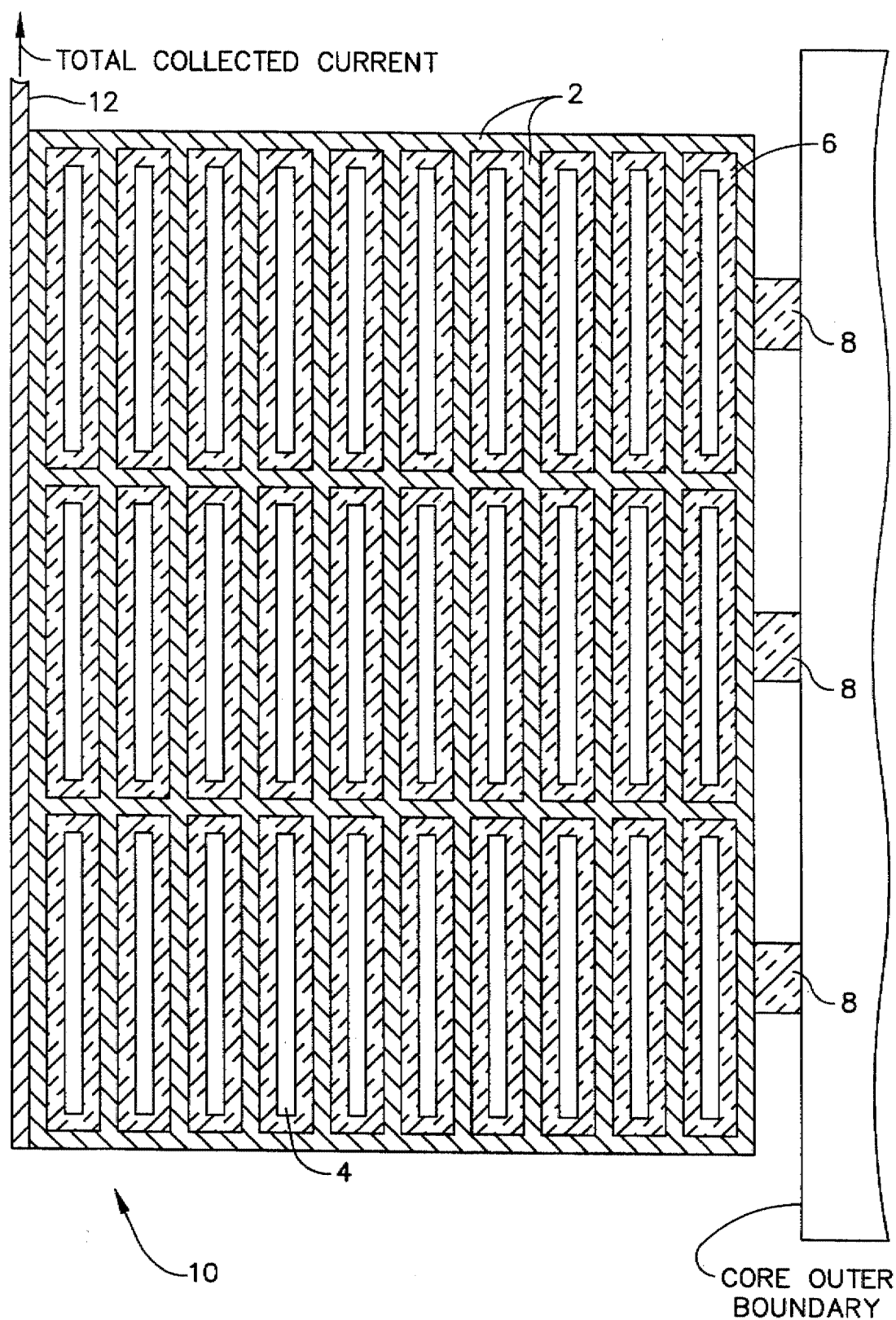
FIG. 2 is a schematic diagram of a multi-cell $\beta$-battery pack in accordance with a preferred embodiment of the invention, shown installed on the core outer boundary.

The $\beta$-battery of the present invention is intended for use inside the reactor pressure vessel of a nuclear reactor, on the periphery or just outside the nuclear fuel core, where exposure to substantial neutron flux will activate the $\beta$-emitting material to produce electrons. In accordance with a preferred embodiment of the present invention, the cell shown in FIGS. 1A and 1B may be replicated many times and connected together ("sandwiched") to provide adequate current for conversion to voltage in practical applications. FIG. 2 is a schematic representation of a multi-cell β-battery 10 having a shroud-like configuration which encircles the core outer boundary. Battery 10 comprises a plurality of stacked annular rings, each ring consisting of a multiplicity of layers (although 10 layers are depicted, the preferred number is 20–30). Each ring layer in turn consists of a multiplicity of cells, preferably square as shown in FIG. 1A, which are arranged in side-by-side relationship to form a circle. Each disk 4 of radioactive isotopic material is electrically insulated from the metallic collector structure 2 by ceramic insulators 6. The β-battery 10 is attached to the core outer boundary by means of a plurality of support rings 8 made of electrically insulating material. In accordance with an alternative preferred embodiment, the exposed surfaces of the metallic collector structure 2 may be encased in an electrically insulating shell (not shown), to which the insulating support rings 8 are attached. The metallic collector structure 2 is electrically connected to a mineral-insulated busbar 12, which carries the total collected current from all of the β-emitting cells to the appropriate applications.

In accordance with an alternative preferred embodiment of the invention, the ceramic insulators are formed as a very thin layer of low-density ceramic electroplated on every β-emitting surface, which is used as a substrate. Then, the ceramic surfaces are metallized and then electroplated with a metal having suitable electrical conductivity, thereby forming metallic collectors. The metal electroplated cells are then bonded together to form a multi-cell array, an example of which is seen in FIG. 2. In this array, the metallic collectors separate each unit cell and form buses which are electrically connected to busbar 12. Processes and techniques similar to those used in semiconductor device fabrication are available for manufacture of the device.

The cells are positioned outside the core at a specific distance, where neutron fluxes are of the proper magnitude to promote the desired kinetics. The displacement distance from the core surface is a characteristic of the reactor power and type, but it suffices to use the mean thermal flux as the primary descriptor. Typically, it is about $2 \times 10^{14}$ cm$^{-2}$·sec$^{-1}$ in steady plant operation.

In each cell, a thin emitter, whose thickness is carefully selected, is supported by the thin ceramics and metallic collector. In the example shown in FIG. 2, each cell has a thickness of about 2 mm. Therefore, a 20-cell assembly is about 4 cm thick, with edge dimension roughly 10 cm.

Each cell composing the battery panel depicted in FIG. 2 is energized by the nuclear decay electrons that traverse the thin ceramic spacers and reach the collector electrodes. The source current arises from the collection of β-particles from all the emitters, without the necessity of external power. The total surface area of the many cells surrounding the core is about $3.5 \times 10^5$ cm$^2$. The stand-off ceramic support rings 8 are typically 10 cm thick, and their height is selected to be sufficient to mechanically support the thin assembly. The overall height of β-battery pack 10 is preferably about ⅔ of the height of the core.

In accordance with a preferred embodiment of the invention having 22 layers. The inboard layers 1–10 incorporate the Tm$^{169}$ isotope as the β-emitter; the middle layers 11–14 incorporate the Dy$^{164}$ isotope as the β-emitter; and the outer layers 15–22 incorporate the Ir$^{163}$ isotope as the β-emitter. The amount of current density j generated by each radioactive isotope can be estimated from the following formula, which takes account of source decay and self-absorption:

$$j = N(\rho z, 1/A\tau\mu)e^{-t/\tau}[1-e^{-\mu l}] \; amp/cm^2$$

where l is the emitter thickness; ρ is the emitter density; A is the emitter mass number; τ is the emitter mean-life $(1.44 t_{1/2})$; $\Im$ is the Faraday constant (96487 coulomb/gm-mole); μ is the electron absorption coefficient of the emitter/insulator; and N is the number of cells.

Figure 3:
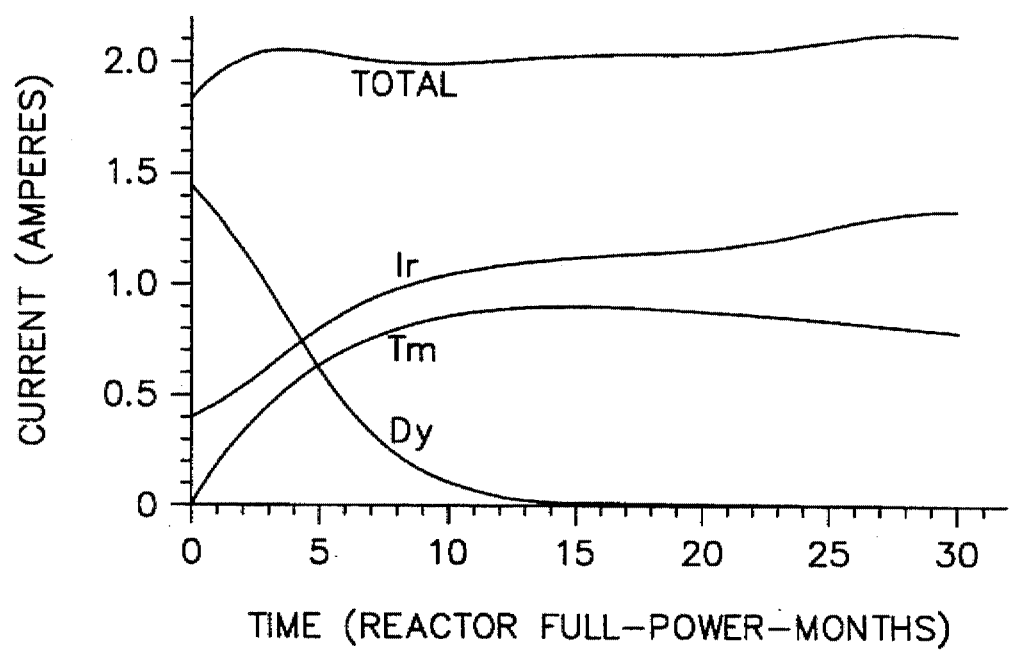
FIG. 3 is a graph of the total current produced by a stabilized 22-cell $\beta$-battery pack (10 Tm cells, 4 Ir cells and 8 Dy cells) as a function of time (measured in reactor full-power-months).

The current generated, as a function of time after being placed in reactor service and taking account of source burn-up and self-absorption, is shown for a typical case in FIG. 3. This graph is the algebraic sum of the separate β-emitters generated by activation of the parent nuclides shown. The eight dysprosium cells provide for fast rise-time and early output. The ten thulium cells sustain the output for intermediate times. The four iridium cells increase the total current to a sustained level exceeding 2 amperes.

There is clear synergism related to this particular choice of nuclides. As the dysprosium decays, the thulium and iridium products build up. Then, as the thulium contribution begins to decline, the iridium current increases to offset the decline in the thulium contribution. This is achieved by proper choice of emitter thicknesses, which are specific to the thermal and epithermal fluxes in the reactor neutron spectrum. The small fluctuations occur on a time scale of the order of months, which is very stable for practical purposes.

Evidently, the total current does not show any tendency to decay at 30 full-power-months, which is at least 3 calendar years. The effective lifetime is extended well beyond this point, which is much longer than would be projected for other choices of isotopes.

Figure 4:
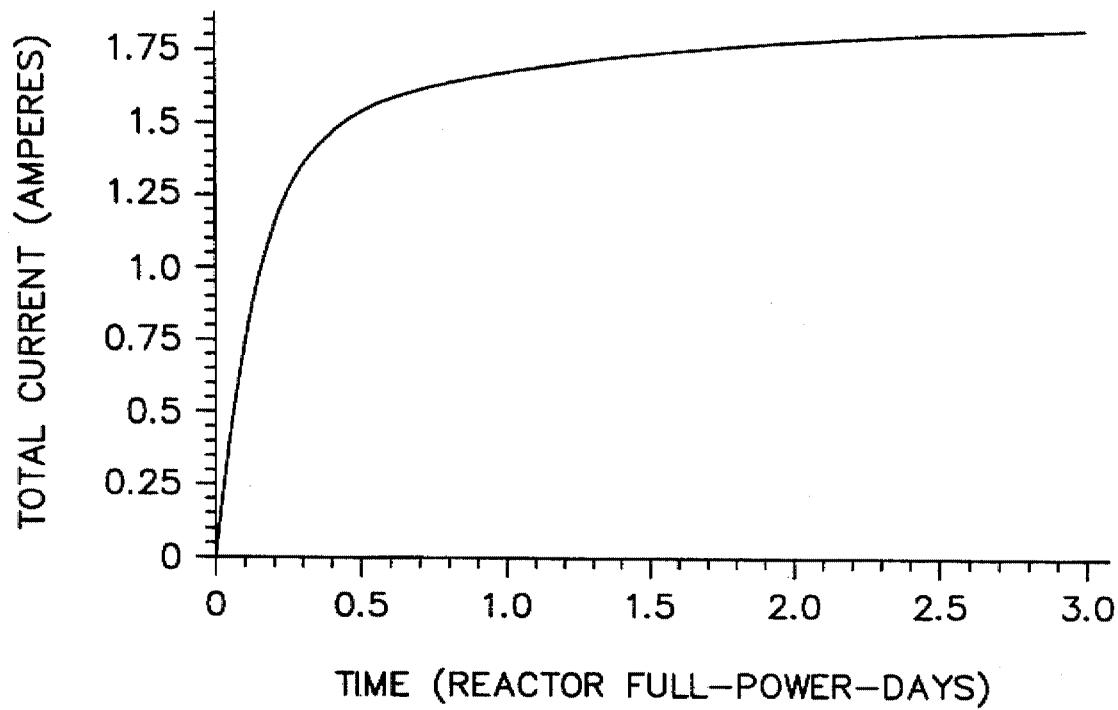
FIG. 4 is a graph of the current rise for a stabilized 22-cell $\beta$-battery pack (10 Tm cells, 4 Ir cells and 8 Dy cells) as a function of time (measured in reactor full-power-days).

The rise-time of the total current is very short (not resolved on the scale of FIG. 3). It takes about 3 hr of reactor operation to activate the output to a level of 1 ampere, as shown in FIG. 4. Therefore, for all practical purposes, the battery is prompt upon exposure to power range levels of neutron flux.

The specific configuration of emitters that achieve long life and stabilized output current is summarized in the Table. The emitter layer numbering convention is from the in-board layer, which is closest to the core outer periphery. The emitter thicknesses shown are the conventional mass units, or the product of density times physical width (mg/cm$^2$). It is desirable to fabricate each layer with density as close as possible to theoretical. Tight process control is required to make each layer of the same material nearly identical.

TABLE

Emitter Parameters for Current Stabilization

| Layer | Parent Isotope | Thickness (mg/cm$^2$) |
| --- | --- | --- |
| 1–10 | Tm$^{169}$ | 46.6 |
| 11–14 | Dy$^{164}$ | 5.13 |
| 15–22 | Ir$^{193}$ | 247 |

The data listed in the Table applies specifically to the location of layer 1 at 10 cm from the core boundary and full-power operation of the reactor. For other nominal operating conditions, the optimum emitter thicknesses may differ. Therefore, the data in the Table should be considered a typical example of many current stabilization schemes that employ the same physical principles.

The present invention can be used to power radiation-hardened circuitry located inside the primary pressure boundary of nuclear plants, without the necessity of electrical penetrations. The neutron-activated current generator is expected to be especially useful in operating plants where in-vessel crack monitoring and data acquisition require a long-lived, self-powered electrical source. The invention also has application in other reactor contexts, such as local suppression of intergranular stress corrosion cracking and monitoring of electrochemical corrosion potential.

The preferred embodiments have been disclosed for the purpose of illustration only. Variations and modifications of those embodiments will be readily apparent to persons skilled in the art of battery design. In particular, it will be appreciated that other β-emitting isotope combinations which produce a substantially constant total current output are within the scope of the present invention. All such variations and modifications are intended to be encompassed by the claims appended hereto.

I claim:

1. A neutron-activatable current source comprising:

a first mass of a first stable isotope material, a first metallic collector electrically insulated from said first stable isotope material by electrically insulating material, and a first electrical lead connected to said first metallic collector, wherein said first stable isotope material has a first property of capturing neutrons from a neutron flux and being activated by neutron capture to a radioactive state having a subsequent decay chain during which at least a first β-particle is emitted to produce a current having a first current-time characteristic; and a second mass of a second stable isotope material different than said first stable isotope material, a second metallic collector electrically insulated from said second stable isotope material by electrically insulating material, and a second electrical lead connected to said second metallic collector, wherein said second stable isotope material has a second property of capturing neutrons from a neutron flux and being activated by neutron capture to a radioactive state having a subsequent decay chain during which at least a second β-particle is emitted to produce a current having a second current-time characteristic, wherein said first and second current-time characteristics are such that the sum of said first and second currents over time has greater stability than either of said first and second currents alone.

2. The current source as defined in claim 1, further comprising a third mass of a third stable isotope material different than said first and second stable isotope materials, a third metallic collector electrically insulated from said third stable isotope material by electrically insulating material, and a third electrical lead connected to said third metallic collector, wherein said third stable isotope material has a third property of capturing neutrons from a neutron flux and being activated by neutron capture to a radioactive state having a subsequent decay chain during which at least a third β-particle is emitted to produce a current having a third current-time characteristic, wherein said first, second and third current-time characteristics are such that the sum of said first, second and third currents over time has greater stability than any one of said first, second and third currents alone.

3. A The current source as defined in claim 1, wherein one of said first and second radioactive isotopes is an isotope of thulium.

4. The current source as defined in claim 1, wherein one of said first and second radioactive isotopes is an isotope of dysprosium.

5. The current source as defined in claim 1, wherein one of said first and second radioactive isotopes is an isotope of iridium.

6. A The current source as defined in claim 2, wherein one of said first, second and third radioactive isotopes is an isotope of thulium.

7. The current source as defined in claim 2, wherein one of said first, second and third radioactive isotopes is an isotope of dysprosium.

8. The current source as defined in claim 2, wherein one of said first, second and third radioactive isotopes is an isotope of iridium.

9. A neutron-activatable current source comprising a multiplicity of current-generating cells arranged as layers in a pack and a metallic collector structure surrounding each of said cells and separated therefrom by electrically insulating material, wherein each of a first predetermined number of successive cells in said pack comprises a first stable isotope material, each of a second predetermined number of successive cells in said pack comprises a second stable isotope material different than said first stable isotope material, and each of a third predetermined number of successive cells in said pack comprises a third stable isotope material different than said first and second stable isotope materials, wherein said first stable isotope material has a first property of capturing neutrons from a neutron flux and being activated by neutron capture to a radioactive state having a subsequent decay chain during which at least a first β-particle is emitted to produce a current having a first current-time characteristic, said second stable isotope material has a second property of capturing neutrons from a neutron flux and being activated by neutron capture to a radioactive state having a subsequent decay chain during which at least a second β-particle is emitted to produce a current having a second current-time characteristic, and said third stable isotope material has a third property of capturing neutrons from a neutron flux and being activated by neutron capture to a radioactive state having a subsequent decay chain during which at least a third β-particle is emitted to produce a current having a third current-time characteristic, wherein said first, second and third current-time characteristics are such that the sum of said first, second and third currents over time has greater stability than any one of said first, second and third currents alone.

10. A The current source as defined in claim 9, wherein the total current output by said multiplicity of current-generating cells is substantially constant for a predetermined duration of time.

11. The current source as defined in claim 9, wherein wherein said first radioactive isotope is an isotope of thulium, said second radioactive isotope is an isotope of dysprosium and said third radioactive isotope is an isotope of iridium.

12. A The current source as defined in claim 9, wherein one of said first, second and third radioactive isotopes is an isotope of thulium.

13. A The current source as defined in claim 9, wherein one of said first, second and third radioactive isotopes is an isotope of dysprosium.

14. The current source as defined in claim 9, wherein one of said first, second and third radioactive isotopes is an isotope of iridium.

* * * * *